2,425,758

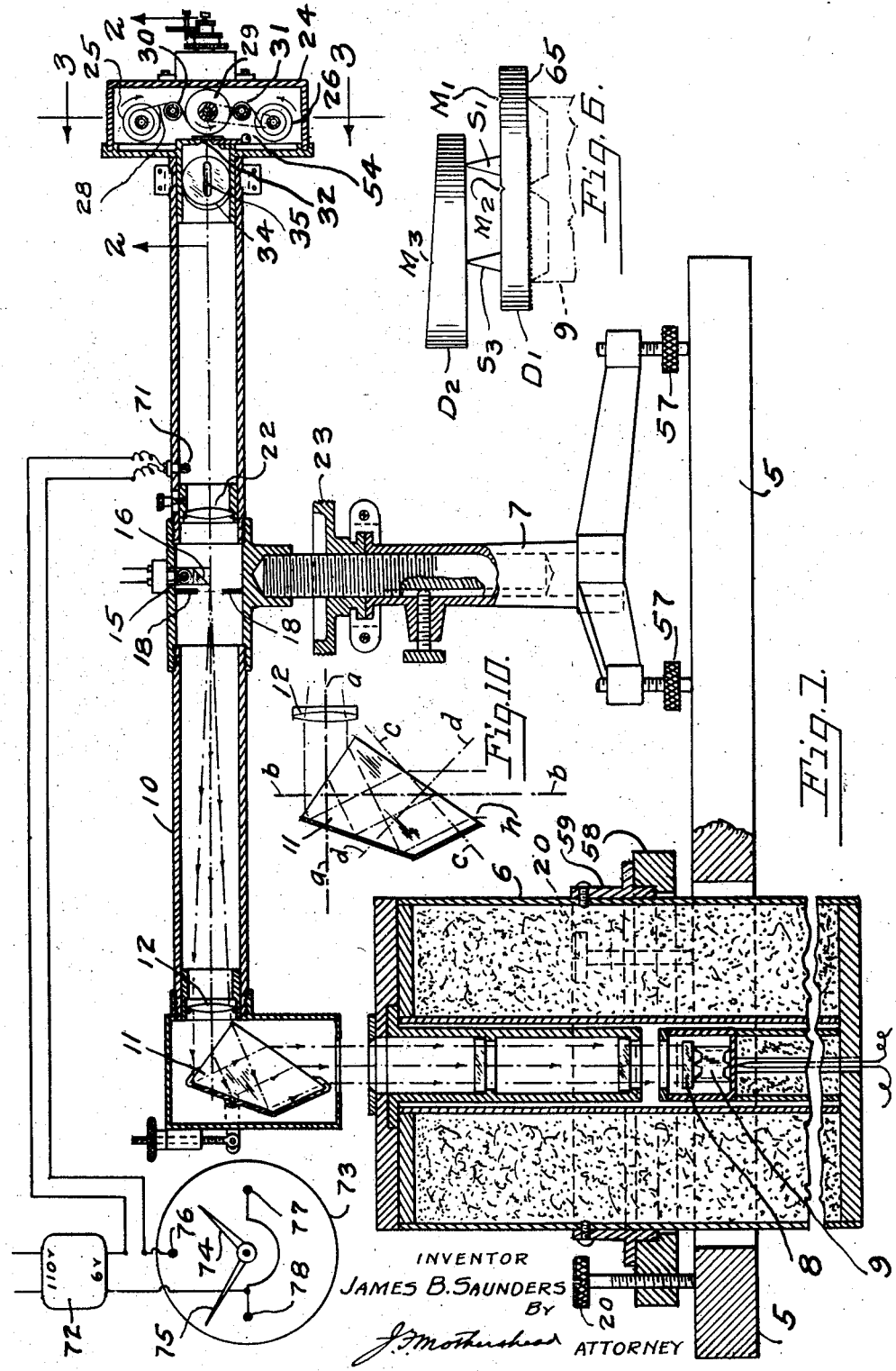

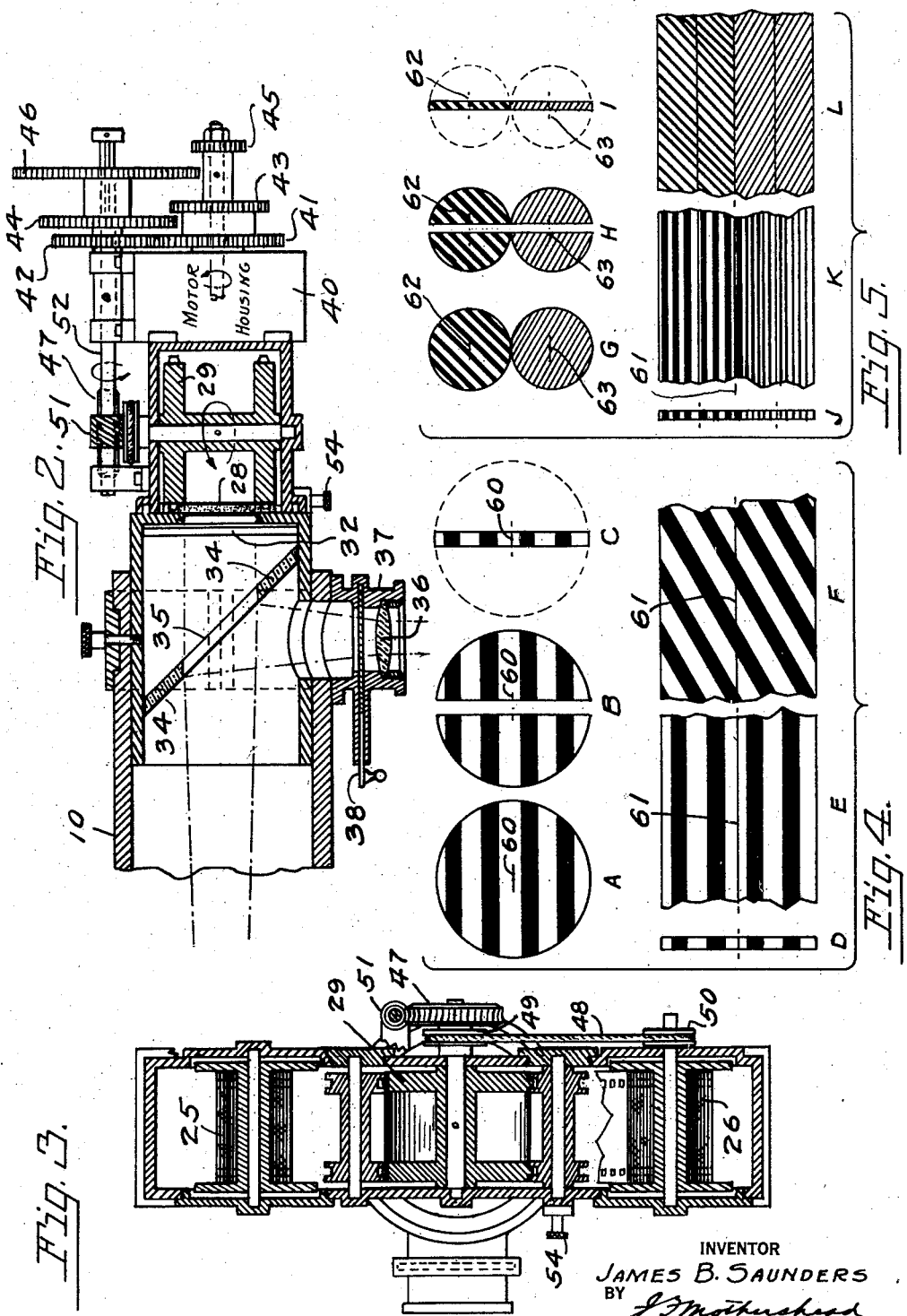

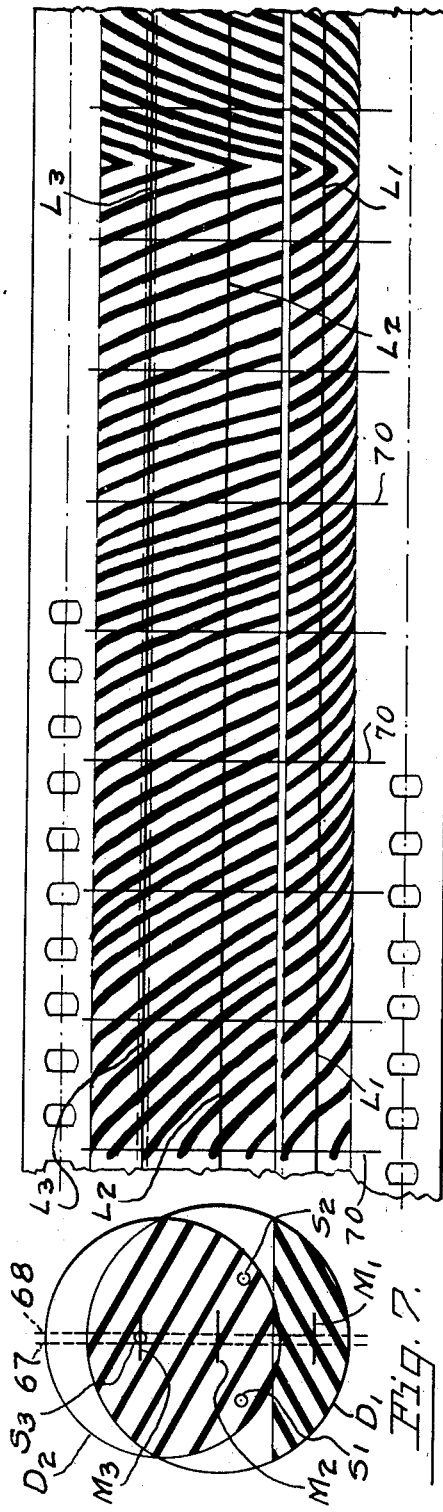
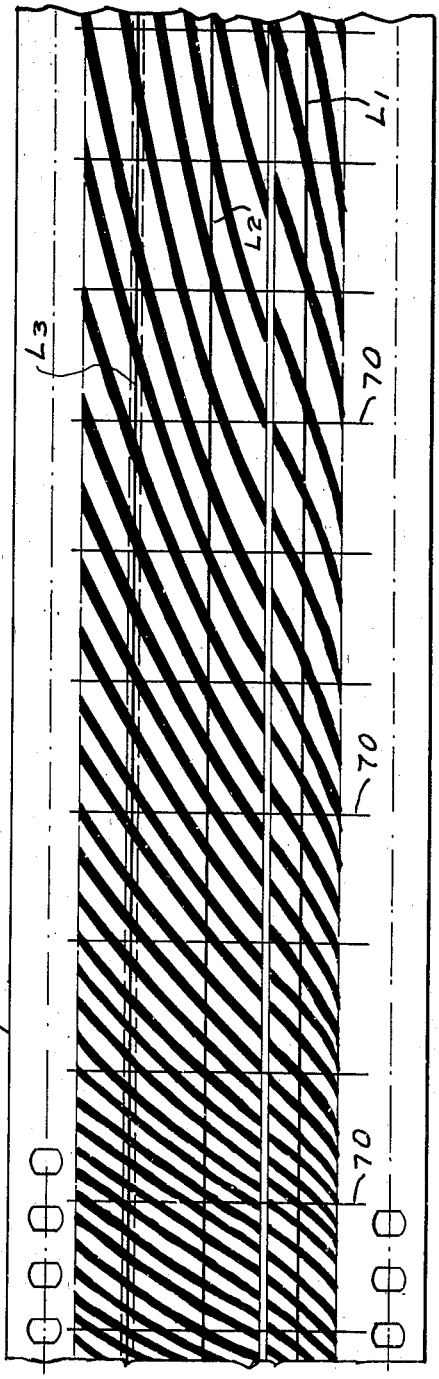
Fig. 7.   Fig. 8.   Fig. 9.
INVENTOR
JAMES B. SAUNDERS
BY
ATTORNEY Patented Aug. 19, 1947

UNITED STATES PATENT OFFICE 2,425,758

PHOTOGRAPHIC APPARATUS FOR RECORDING INTERFERENCE PHENOMENA

James B. Saunders, Alexandria, Va., assignor to the United States of America, as represented by the Secretary of Commerce Application April 27, 1944, Serial No. 532,930

6 Claims. (Cl. 234—60)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

The present invention relates to apparatus adapted for observation of interference patterns over extended periods of time and more particularly to apparatus adapted for photographic recording of changes or shifts in such interference patterns. Apparatus of this type is of particular utility for the measurement of minute changes in the physical properties of materials, especially such changes as occur under the influence of temperature, magnetization, electrostatic fields and other natural changes. In the case of optically transparent materials (liquids or solids) apparatus of this type may be used to determine also the changes in the index of refraction and strain of the material when subjected to changes in temperature, concentration, density or the like.

One object of this invention is to provide photographic apparatus for recording interference phenomena capable of giving a continuous record rather than an intermittent one. Another object of the invention is to provide apparatus of this character which uses relatively little film or other photosensitive material even when recording interference fringes at their natural width. Still a further object is to provide apparatus of this class suitable for making photographic records which may be read and interpreted without the use of any reading or enlarging instrument. Other objects of the invention include the provision of an optical system of special advantage and convenience in such photographic apparatus and the provision of arrangements for adjusting the position of the specimen to correct for thermal influences and the like acting upon the mounting arrangements, with a minimum effect on the observed results.

The invention may be conveniently described in connection with the appended drawings, in which:

Figure 1 shows one form of apparatus in accordance with the present invention, principally in longitudinal cross section, but partly in side elevation and partly diagrammatically;

Figure 2 shows the recording and observing portion of the instrument shown in Figure 1, but in a cross section at right angles to the plane of the cross section shown in Figure 1 passing through the center line as indicated by the arrows 2—2 on Figure 1;

Figure 3 is a transverse cross-sectional view of the recording apparatus of the instrument shown in Figure 1, as indicated by arrows 3—3 in Figure 1;

Figures 4 and 5 are diagrams illustrating the manner in which the displacement of interference fringes is recorded in the apparatus of Figure 1;

Figure 6 is a side elevation of a form of interferometric apparatus which is particularly useful in measuring the influence of temperature upon material substances;

Figure 7 is a top plan view of the apparatus in Figure 6 showing typical interference patterns superimposed on the parts thereof, together with lines defining the region of the patterns photographed;

Figures 8 and 9 show typical records obtained with the use of interferometric apparatus such as that shown in Figure 6 located in a photographic recording instrument of the type shown in Figure 1, and Figure 10 is a diagram of a portion of the optical system of the instrument shown in Figure 1.

The apparatus shown in Figure 1 is supported upon a base 5 which supports a furnace 6 and a standard 7. The particular apparatus shown is adapted for interferometric measurement of specimens subjected to changes in temperature. For other types of measurements different types of specimen holders might be substituted for the furnace 6, for example refrigerating apparatus, a magnetizing coil, etc.

Inside the furnace 6 is mounted a transparent specimen 8 supported upon a suitable mount 9. The standard 7 supports a tube 10 which at one end carries the prism 11 and the associated collimating lens 12 and at the other end carries a photographic recording apparatus presently to be described. About the middle of the tube 10, and off-center, is located the light source 15, light from which is introduced into the tube 10 through a small reflecting prism 16. Instead of the prism 16 a diagonal mirror might be used.

The position and spacing of interference fringes vary with the wave length of the light which is used. For accurate measurements, particularly by photographic means, it is desirable to make measurements and set up interference patterns by means of light which is highly monochromatic. This may be done in a number of ways, the most common one being probably the use of a filter in the optical system which permits the passage of light of only a certain range of wave lengths. Most filters, however, attenuate appreciably the light which the filter is intended to transmit, which tends to make it difficult to use such arrangements in photographic recording apparatus employing ordinary high sensitivity film. I prefer to use a different method for the selection of the wave length of the light to be used for the measurement which dispenses with the use of filters and with the consequent absorption of light in the optical system. I prefer to use a light source which has a bright-line spectral emission characteristic and to provide in the optical system an element introducing relatively high dispersion so that the separate beams of light produced by light corresponding to the respective bright lines of the spectrum will be substantially displaced and so that one of these beams can readily be selected for observation without substantial interference from the other beams.

For the light source 15 I prefer a helium lamp because the spectral lines of its emission characteristic in the visible range are well separated and include usable lines in the red, yellow, and blue portions of the spectrum. In order to provide the desired dispersion in the optical system, I use a prism 11 of the constant-deviation type, as designed by Pellin and Broca. (See Journal de Physique 1899, Tome 8, pages 314 to 319, article by Ph. Pellin and A. Broca.) This prism may be made of dense flint glass. When the prism is oriented approximately as shown in Figure 1, it will exhibit constant deviation properties so that the entering and departing angles of the light ray passing through the prism are equal irrespective of the angular adjustment of the prism for the selection of a particular portion of the spectrum to be passed out of the prism at an angle of 90° with respect to the beam initially entering the prism. The deviation produced by the prism is 90° for a selected wave length or narrow portion of the spectrum. For other wave lengths the constant deviation properties do not hold, thus affecting the focusing characteristics of the system (axial displacement of the image) and the deviation produced is in general not equal to 90°, thus producing a lateral shift of the image. The wave length for which the prism exhibits constant deviation properties may be varied by rotating the prism about an axis parallel to its optical faces, as is more fully explained in connection with Figure 10 described below. The position of the prism may thus be adjusted for measurement with any of the bright lines of the spectral characteristic of the light source in the visible range. In order to provide still further discrimination with respect to the wave length of light in the measurement for which the apparatus is intended, I prefer to employ in the recording apparatus a type of photosensitive material or film which is decidedly sensitive to some colors of light and relatively insensitive to others. Thus, for example, I may use film of the orthochromatic type which is sensitive to blue light but practically insensitive to the red light which might reach the film from a red-hot furnace.

A diaphragm 18 with a fairly broad horizontal slit at its center is placed in front of the reflecting prism 16. The reflecting prism 16 is conveniently arranged to obstruct only the upper half of the opening in the diaphragm 18, so that the upper half of the diaphragm 18 serves to limit a beam of light issuing from the light source, while the lower half serves to admit a beam of similar size while excluding beams which have been deviated by the prism 11 by amounts substantially more or less than the deviation of the desired beam.

The diaphragm 18 is preferably provided with movable upper and lower jaws geared together so that the vertical width of the slit may be varied without shifting the center of the aperture from the optic axis of the collimating lens 12. The length of the slit may be fixed by a screen (not shown) having a rectangular aperture, the horizontal width being a few millimeters and the vertical width exceeding the maximum width attainable with the movable jaws of the diaphragm 18. The upper jaw of the diaphragm 18, together with the lower edge of the prism 16, forms the rectangular aperture with which the vertical width of the effective source may be controlled, while the lower jaw of the diaphragm 18, together with the lower edge of the prism 16, forms a variable slit aperture for controlling the vertical width of the transmitted portion of the spectrum produced by the prism 11. When the desired reflected rays are focused by the lens 12, they will converge to form an image of the effective source in the lower half of the aperture in the diaphragm 18 in the focal plane of the collimating lens 12.

The collimating lens 12 forms a beam of parallel rays from the light reflected from the prism 16 through the diaphragm 18. The component rays of this beam which are of the desired wave length, corresponding to one of the bright lines of the spectral emission characteristic of the helium lamp 15, retain their parallelism during and after passage through the prism 11, because the latter is adjusted to provide constant deviation characteristics for that wave length and these rays are furthermore deviated through a resultant angle of 90° and thereafter proceed downward, as shown in Figure 1. These rays provide illumination for the transparent specimen 8 which may, for example, be a plate of optical glass with two highly polished plane surfaces which are almost but not quite parallel, so that the two beams of light reflected from the two surfaces will produce a regular series of interference fringes in accordance with well-known principles. The two reflected parallel light beams proceeding upward will again pass through the prism 11 without loss of parallelism and with 90° deviation and this reflected beam will be brought to a focus approximately in the plane of the diaphragm 18 by the lens 12. The inclination of the sample or specimen 8 is arranged (in the apparatus illustrated it may be adjusted by means of the screws 20) to return the desired reflected rays through the lower half of the slit or opening provided by the diaphragm 18. These rays then pass through an additional lens 22, which serves to focus an image of the interference pattern upon the photosensitive strip 28, which may be a piece of photographic film, or paper located in the recording apparatus at the right-hand end of the tube 10.

The lens 22 may be dispensed with if the collimating lens 12 is of such a focal length that the primary image of the specimen 8 falls near the location of the portion of the photographic strip 28 exposed through the slit in the screen 32. In such case, the focusing adjustment, which would otherwise be accomplished by adjusting the axial position of the lens 22, may be provided by other means, such as by the manipulation of the nut 23, for elevating or depressing the upper portion of the standard 7, and with it the tube 10, thereby adjusting the length of the optical path between the lens 12 and the specimen 8.

The photographic recording apparatus at the right-hand extremity of the tube 10 consists of a light-tight box 24 with a supply reel 25 and a take-up reel 26, which may be driven as in a motion picture camera, a photosensitive strip 28, such as a piece of photographic film of the type used in motion picture cameras, adapted to be unwound from the supply reel 25 and to be wound up on the take-up reel 26, a sprocket wheel 29 over which the photosensitive strip 28 may be passed, two "floating" rollers 30 and 31 which cause the photosensitive strip 28 to maintain close contact with the sprocket wheel 29, and a screen 32 having a centrally located slit through which the photosensitive strip or film 28 may be exposed. The slit in the screen 32 is parallel to the axis of the sprocket wheel 29 and may be varied in width by means of the cam 54. The axial position of the lens 22 is adjusted to produce an image of the interference patterns produced by the sample 8 a portion of which is focused on the photosensitive strip 28 through the slit in the screen 32.

An elliptically-shaped mirror 34 with a fixed central horizontal slit 35 along its major axis is diagonally interposed in the tube 10 at 45° to the axis of the tube (see also Figure 2) in order to permit visual observation of the interference patterns produced by the specimen 8 except for such portion as passes through the slit 35 which is in alignment with the slit formed by diaphragm 18. For this purpose, as shown in Figure 2, the diagonal mirror 34 cooperates with the eyepiece lens 36 mounted in the branch tube 37. A shutter slide 38 is also provided to permit closing off the branch tube 37 when it is not in use in order to prevent light entering through it into the tube 10 from fogging the photosensitive strip 28. The slit 35 in the diagonal mirror 34 is of such dimensions as not to obstruct any of the light passing from the aperture in the diaphragm 18 through the lens 22 and thence on a path which would lead it through the slit in the screen 32. The slit 35 is therefore somewhat larger than the slit in the screen 32.

With reference to Figures 2 and 3, the sprocket wheel 29 is driven at one of several available speeds by means of a synchronous motor 40 through one of the pairs of gears 41—42, 43—44, or 45—46 and the worm 51 mounted on shaft 52, the worm 51 meshing with worm-gear 47. The gears 42, 44, and 46 are made on a common hub splined to shaft 52 for axial movement along said shaft to permit changing of the gear ratio by a shift in the axial position of gears 42, 44, 46. The take-up reel 26 is powered by means of a slip-belt 48 which runs on pulleys 49 and 50. Pulley 49 is mounted on the same shaft as the sprocket wheel 29 and the worm-gear 47. The worm 51 is powered by the shaft 52 through one of the aforementioned three pairs of spur gears, 41—42, 43—44, or 45—46. The ratios of these three pairs of gears determine the three possible speeds available in this particular apparatus. The speed is selected by a gear-shift arrangement which permits the operator to slide the gears 42, 44, and 46 which move as a rigid body along the shaft 52, the spacing between these gears being sufficient to prevent more than one of them being engaged with its mate at any time.

The width of the narrow horizontal slit in the screen 32 is controlled by an eccentric cam 54 and a restoring spring arrangement (not shown in detail). The width of this slit, together with the speed of the photosensitive strip 28, determines the duration of the exposure for any point on the strip 28. Other variations in the amount of exposure may be effected by the diaphragm 18 and by varying the intensity of the light source 15.

When the furnace 6 is subjected to wide variations in temperature, differential thermal expansions in the furnace walls and mountings may result in a slight but appreciable tilting of the specimen 8 which is sufficient to cause serious interference with the measurements which the instrument is otherwise adapted to perform. Correction for such tilting of the specimen 8 by adjusting the position of the standard 7 by means of the screws 57 will enable the interference patterns to be kept in view, but an adjustment of this type results in a shifting of the patterns which causes an apparent break in the record produced in the photographic recording apparatus. Although the record so produced will not be rendered erroneous by such a shift in the patterns recorded, such shifts do increase the difficulty of reading and interpreting the record. This difficulty may be avoided, however, by correcting for the tilt of the specimen by tilting the furnace instead of by tilting the standard 7. For this purpose it is important that the tilting of the furnace should correct for the tilt of the specimen 8 without substantial translatory movement of the latter. This may be accomplished by the arrangement shown in Figure 1, including the screws 20 mounted in the ring 59, upon which the furnace 6 is supported. The length of the screws 20 is such that the specimen 8 particularly the portion of the specimen 8 bearing a reference marker as described below, lies approximately in the plane of the upper surface of the base 5, upon which the screws 20 operate. Manipulation of the screws 20 will thus enable the specimen 8 to be tilted.

Diagram A of Figure 4 represents an image that might be formed in apparatus of the type shown in Figure 1 when the specimen 8 is a simple glass disc with highly polished plane surfaces almost but not quite parallel to each other. The broad dark lines of this diagram correspond to those locations on the specimen 8 where the thickness is such that the light reflected from the upper surface of the specimen destructively interferes with the light reflected from the lower surface of the specimen, whereas the light stripes between them indicate the location on the specimen 8 in which no such destructive interference takes place. Actually, in the situation described, the dark fringes as visually observed would shade off into the bright areas and the bright areas would be brightest in the middle where the light reflected from the two surfaces would reinforce each other, since the thickness of the specimen 8 in the case assumed varies gradually over the disk. On a photograph of the fringes the dark bands may be sharpened by the contrast characteristics of the film employed.

A line perpendicular to the fringes indicates the direction of the thickness gradient. The mark 60 is a reference mark which may be scratched into either surface of the specimen 8. Such a scratch mark will be readily observable as a narrow line on the image.

Diagrams B and C represent the portions of the image shown in diagram A which might be observed, respectively, through the eyepiece 36 with the diagonal mirror 34, in the case of diagram B and, in the case of diagram C, on the portion of the film or photosensitive strip 28 exposed through the slit in the screen 32. For the purpose of these diagrams, it is assumed that the slit in the mirror 34 extends entirely across the image and that this slit is just big enough to avoid interference with any light directed toward the aperture of the slit in the screen 32. Diagram D repeats the portion of diagram C drawn in solid lines.

If now the photosensitive strip or film 28 is moved past the slit in the screen 32 with the image focused on the strip through the slit as just described, the result will be as shown in diagram E, a series of parallel stripes each directed longitudinally of the moving photosensitive strip and corresponding to the portion of interference fringes intercepted by the slit in the screen 32. If at the same time that the photosensitive strip is in motion, the fringes are displaced (moving usually in a direction perpendicular to their orientation, which is to say parallel to the thickness gradient), the resultant record on the moving photosensitive strip will be a series of diagonal stripes, as shown in diagram F. Such a displacement of the fringes might result from thermal expansion or contraction of the specimen 8 and in the normal case a factor would also enter into the displacement corresponding with the further change in optical path length through the specimen 8 as a result of thermally induced changes in the refractive index of the specimen. The reference marker 60 produces in diagrams E and F a thin straight line 61 and from diagram F it may readily be seen that the total change in optical path length in the specimen 8, including the contribution of dimensional expansion and change in refractive index, over a given period, may be directly determined by observing the number of fringes crossing the reference line 61 in the portion of the photographic record covering that period of time.

In order that the direction of movement of interference fringes may be followed it is desirable that the interference fringes being photographed should move with a substantial component of their motion parallel to the long dimension of the slit through which the moving photosensitive strip is exposed. The greatest effect on the record will be when the direction of motion of the fringes is parallel to the long dimension of the slit, but that situation is not necessary so long as the fringes are more or less transverse to the slit. The orientation of the fringes as they appear when projected through the slit may be controlled by turning the specimen 8 in Figure 1 about a vertical central axis. For this purpose the ring 58 is shouldered to support the ring 59 supporting the furnace with the two concentric portions 58 and 59 relatively rotatable about their common center, so that the specimen may be rotated about an approximately vertical axis by rotation of the entire furnace.

It may be desirable to make simultaneous records of the displacement of two sets of interference fringes. Thus, it may be desirable to mount two specimens in the furnace 6, one made of a material of known properties and one of properties which it is desired to compare with the properties of the other material. Figure 5 shows the images and record which may be produced with such an arrangement. Diagram G of Fig. 5 shows the image which might be produced by two specimens of the type previously described located side by side, with tangent edges. In this particular case the fringes are shown in an oblique position instead of a horizontal position, but, as shown in the diagram I, they are still transverse with respect to the slit through which the photosensitive strip is exposed. Diagram H corresponds to diagram B of Figure 4 and shows the portion of the interference pattern which might be viewed through the eyepiece 36 with the assistance of the diagonal mirror 34, whereas diagram I shows a portion of the image which falls upon the photosensitive strip and, therefore, corresponds to diagram B of Figure 4. In this case each of the specimens is provided with a marker line, these lines being shown respectively at 62 and 63.

Diagram K shows the form of record produced upon the moving strip when the fringes shown in diagrams I and J remain stationary and diagram L shows the form of record that results when the lower set of fringes moves downward and to the left and the upper set of fringes moves upward and to the left, while the photosensitive strip moves past the slit.

It will be seen that only a narrow strip of the interference pattern is recorded by this arrangement. In most cases, however, the entire configuration of the interference pattern produced by a given specimen is of relatively small moment, and it can usually be adequately observed intermittently, as by visual observation through the eyepiece 36. What is usually most important in measurements extending over substantial periods of time in which it is desired to keep track of the total changes over various periods is the displacement of the interference pattern. As pointed out in the description of this invention, this may be adequately achieved by observation of a substantially linear element of the interference pattern, particularly if such linear element is directed transversely to the orientation of the interference fringes, so as to intersect the latter. The displacement of fringes intersecting such a linear element of the interference pattern may readily be recorded in a continuous manner on a moving photosensitive strip, in accordance with this invention with a great economy in the amount of film used, since the portion of film exposed at any one time need be only a very thin line effectively across the moving strip.

Figure 6 illustrates a particularly useful form of interferometric device adapted for use in the arrangement of Figure 1 instead of the specimen 8. This type of device is discussed in greater detail in certain publications of the National Bureau of Standards, particularly Scientific Paper No. 485 (vol. 19, page 357) and Research Paper RP1227 (vol. 23, Journal of Research of the National Bureau of Standards, page 179).

The interferometric device includes two transparent discs $D_1$ and $D_2$. These discs are separated by three small cone shaped or tripod-shaped samples $S_1$, $S_2$, and $S_3$ of a material whose properties it is desired to observe, ($S_2$ is not visible in Figure 6 being behind $S_1$, but its position is shown on the diagram, Figure 7, which will be presently explained). The upper disc $D_2$ is supported in offset relation to the lower disc $D_1$, placing a relatively large proportion of its weight upon the specimen $S_3$ (for the reason given in the aforesaid research paper RP 1227 of the National Bureau of Standards) and at the same time allowing a portion of the light incident from above to fall directly upon the lower disc $D_1$.

The lower surface of the disc $D_1$ is polished in part, as shown at 65 and roughened or ground in other portions, as shown in Figure 6. The roughening or grinding scatters incident light and serves to prevent the creation of an interference pattern by interference of reflections from upper and lower surfaces of the disc $D_1$ in that part of the disc which is covered by the disc $D_2$. The right hand end of the disc $D_1$, however, is provided with almost parallel polished surfaces for the purpose of producing an interference pattern. The disc $D_1$ is preferably made of a material of well known properties so that the movement of the interference fringes produced at its right hand extremity may be used for reference purposes—this disc may thus be regarded as an accurate relative thermometer. The upper surface of the disc $D_2$ is cut at a substantial angle to the lower surface, more or less as shown in Figure 6, in order that the light reflected from it will be reflected out of the optical system of the instrument, thereby avoiding interference with the light reflected from the other surfaces of the interferometric apparatus. A second set of interference fringes will, however, be produced by the interference of light reflected respectively by the lower surface of disc $D_2$ and by the upper surface of disc $D_1$. The samples $S_1$, $S_2$ and $S_3$ are made with a high degree of uniformity in order to bring the polished surfaces just mentioned into a very near approach to the parallel condition. Marking scratches are provided as shown at $M_1$, $M_2$ and $M_3$ (shown also in Figure 7) in order to provide reference points and in order to produce reference marks upon the test record.

Apparatus of the type above described is useful for determining the thermal properties of opaque materials, since light is not required to go through the samples $S_1$, $S_2$ and $S_3$. This type of apparatus is also useful for measuring the change of index of refraction of optical materials with the temperature, which can readily be done by making the samples $S_1$, $S_2$ and $S_3$ out of the same material as the disc $D_1$, in which case one set of fringes will correspond to the total effect of dimensional expansion and change of index of refraction, whereas the other set of fringes will show the effect of dimensional expansion only (assuming, of course, that the index of refraction of the space between the plates does not change with temperature).

Figure 7 illustrates the image which might be formed in the instrument shown in Figure 1 when an interferometric device such as that shown in Figure 6 is employed in place of the specimen 8 of Figure 1. The dotted lines 67 and 68 indicate the portion of the image which is projected upon the moving strip 28 through the slit in the screen 32. The furnace 6 can be rotated about its vertical axis, in order to cause both sets of fringes to fall upon the slit 35.

Figures 8 and 9 show consecutive portions of a typical record made with an apparatus of the type of Figure 1 in which an interferometric apparatus of the type shown in Figure 6 is substituted for the specimen 8. In this record the overlapping portion of the two sets of fringes has been blanked out by an obstruction such as a small rod (not shown) appropriately located across the slit of the screen 32. This arrangement serves to make clear the division between the upper and lower sets of fringes. The marker lines $L_1$, $L_2$ and $L_3$, corresponding respectively to the reference markers $M_1$, $M_2$ and $M_3$ (Figures 6 and 7) appear as horizontal lines in Figures 8 and 9, $L_3$ being within the trace corresponding to the specimen $S_3$, but being still visible. For reasons given in the aforementioned research paper of the National Bureau of Standards, it is important that a reference marker be provided near the position of the specimen $S_3$. The partial shadow of the specimen $S_3$ does not greatly hinder the use of such a marker and it is not difficult to interpolate the fringe pattern to the marker line. The shadows of the specimens $S_1$ and $S_2$ do not appear in Figures 8 and 9 because they do not fall on that part of the interference pattern which is projected through the slit in the screen 32 upon the moving photosensitive strip.

In order to provide accurate comparison between the records of the two sets of fringes and in order to facilitate the interpretation of the records, it is desirable to provide means for marking a time scale upon the record. This may be done simply by extinguishing the light source 15 or interrupting its light by a shutter for a brief moment at predetermined time intervals, thus leaving unexposed transverse stripes or lines on the photosensitive record. Another method of marking a time scale which is particularly convenient is to provide additional illumination for brief moments at predetermined time intervals, thus producing over-exposed transverse lines or stripes on the photosensitive strip 28, such as those indicated by the vertical lines 70 in Figures 8 and 9. When the photosensitive strip 28 is moved at a uniform rate, these vertical lines will be uniformly spaced. The position of the fringes at any moment may then be determined from the record by constructing a line parallel to the vertical lines 70 and spaced from the nearest of these lines in accordance with the time interval in question.

The additional intermitten illumination for producing the lines 70 on the record is provided in the apparatus of Figure 1 by means of the lamp 71 located in the tube 10 to the right of the lens 22. This lamp should be so placed that sufficient light reaches the photosensitive strip 28 in spite of the interposition of the diagonal mirror 34 and yet the lamp 71 should not protrude so much into the tube 10 as to obstruct the light forming the interference pattern being observed. In actual practice, therefore, the lamp 71 would normally be introduced at the side of the tube 10 instead of at the top, but it is shown at the top in Figure 1 merely to simplify the illustration. If desired, the lamp 71 may be placed to the right of (behind) the diagonal mirror 34. The lamp 71 is energized by a transformer 72, in series with a timing device 73. The timing device 73 has a slowly-moving arm 74 and a fast moving arm 75 and the lamp is energized only when the arm 75 is in contact with the contact 76 and the arm 74 is at the same time in contact either with the contact 77 or the contact 78. Thus the arm 74 is important in determining the length of the interval between flashes of the lamp 71, while the arm 75 acts to provide accurate spacing between flashes. If the arm 74 revolves once an hour and the arm 75 revolves once a minute, as in the case of an ordinary clock, the flashes of the lamp 71 will be spaced 30 minutes apart. By the use of three equally spaced contacts instead of the two contacts 77 and 78 a spacing of 20 minutes between flashes may be obtained, and so on. The arm 75 should not, of course, make contact with the contact 77 or the contact 78 and likewise the arm 74 should not make contact with the contact 76. The contacts 77 and 78 should be sufficiently small so that the arm 75 will make only one contact with the contact 76 while the arm 74 is in contact either with the contact 77 or with the contact 78.

The consecutive record shown in Figure 8 and Figure 9 may represent the movement of interference fringes resulting from a gradual heating followed by a gradual cooling of an apparatus such as that shown in Figure 6, in a furnace such as the furnace 6 of Figure 1. It will be noted, by comparison of Figures 7 and 8, that the inclination of the dark bands in the record on the photosensitive strip 28 corresponds not with the orientation of the fringes but with the direction in which they move across the slit defined by the dotted lines 67 and 68. Assuming that the left hand portion of the record shown in Figure 8 and Figure 9 were first exposed and that the record of Figure 9 is a continuation of and follows that of Figure 8, it will be seen that in the first part of the test here recorded both sets of fringes moved downward. The rates of movement of the two sets of fringes were not greatly different although those in the lower set moved somewhat more slowly, as is indicated by the slightly smaller inclination of the dark stripes in the lower record in at least part of the period covered. Toward the end of the portion of record shown in Figure 8 the direction of motion of the fringes was suddenly reversed, indicating a change from a rise of temperature to a fall of temperature, the movement of the fringes at first being rapid and later gradually slowing down as shown in the right hand portion of Figure 9. One might almost hazard a guess on the basis of this record that the gradual slowing down of the movement of the fringes corresponds to the well-known characteristic exponential cooling curve. The change in the direction of motion of the fringes is shown in Figure 8 by the change in the inclination of the dark bands of the record from a negative to a positive slope.

The general type of apparatus shown in Figure 1 not only lends itself to the accurate and economical recording of interferometrically observed physical phenomena taking place over extended periods of time, but it also has the advantage of being readily adjustable for measurements with light of various wave lengths. The lamp 15 may emit light at several usable wave lengths corresponding to several bright lines of its spectrum. A simple rotation of the prism 11 will serve to adapt the apparatus for measurements at any of these wave lengths, thus permitting a series of measurements at different wave lengths without disturbing the specimen and with a minimum of adjustment of the apparatus. The photosensitive strip may be changed when the wave length of light used is changed, in order to provide maximum sensitivity, or for the purpose of these comparative tests a strip of film sensitive to all of the colors used in each part of the test may be used with a slight sacrifice of color discrimination in each branch of the test.

When taking advantage of the color selection properties of prism 11 it is important to select the axis about which the prism 11 is rotated for the purpose of color selection, as will now be explained.

The prism 11 and its associated collimating lens 12 are shown in Figure 10. The center lines $a$ and $b$ are respectively the axial rays of the entering and departing beams of light. Rotation of the prism about some axis chosen at random but perpendicular to the lines $a$ and $b$ will change the wave length for which right angle deviation is obtained and will generally also change the total optical length of the path of the beam of light although this part of the wave length for which right angle deviation properties is obtained will always be at the same deviation with respect to the incident beam, which is to say 90°, the point of departure from the prism will usually be shifted by rotation, which is to say that the center line $b$ may be shifted with respect to the center line $a$ while remaining perpendicular thereto. The latter effect would produce a shift of the image upon rotation of the prism 11. I have found that the axis about which the prism 11 is rotated may be chosen so as to minimize either or both of these effects. Thus in the form of prism shown in Figure 10, rotation of the prism about any axis lying in a plane perpendicular to the diagram and passing through the line $c$ will produce practically no change in the total optical path length, which is to say that the focus of the image will not be disturbed by rotation of the prism within the operating range. Furthermore, rotation about any axis lying in a plane passing through the line $d$ and directed perpendicularly to the diagram will be accompanied by a minimum or zero shifting of the line $b$. If now an axis of rotation is chosen passing through or very near to the intersection of the lines $c$ and $d$, rotation about such axis for the purpose of selecting the wave length of light at which it is desired to operate may be accomplished with practically no shifting of the image either along the optical axis (change of focus) or across the optical axis. I, therefore, prefer so to locate the axis for the rotational adjustment of the prism 11.

The exact arrangement for rotating the prism 11 has not been shown on Figure 1 in order to simplify this illustration, but it will be understood that any convenient mechanical method of rotation may be used and that the axis of rotation is preferably determined as just explained in connection with Figure 10. It may be further observed that the chromatic aberration of the collimating lens 12 may be taken into account in connection with the location of the axis of rotation of the prism 11, as may be also the chromatic aberration of the lens 22. Thus the axis of rotation of the prism 11 may be located at a distance far enough off the line $c$ to compensate for the chromatic aberration produced by the lenses 12 and 22, at least at one or a few particular wave lengths. In such an arrangement great care need not be taken to provide achromatic characteristics for the lenses 12 and 22, which may constitute a considerable advantage in special cases, as, for example, in case it should be desired to use optical elements of quartz or high silica glass for the purpose of making measurements with wave lengths at which other optical materials are not satisfactorily transparent.

It will be understood that the apparatus of this invention may be combined into a mechanically unitary structure instead of being provided in the form of a pair of units adjustably resting upon the base 5 as shown in Figure 1. It will be apparent that other modifications may be made in the utilization of the invention without departing from the essential principles of the invention.

What I desire to claim and obtain by Letters Patent is:

1. Apparatus for continuous interferometric measurement over a period of time, including a source of light having a bright-line spectral emission characteristic, a constant deviation prism of the Pellin and Broca type so positioned with respect to said source of light as to deflect light therefrom through an angle of approximately 90 degrees onto a plurality of reflecting surfaces held in a manner adapted for interferometric measurement of changes in the distance between them, means including said constant deviation prism and a lens system for deflecting the light from said reflecting surfaces through an angle of approximately 90 degrees and projecting an image of the interference pattern set up by the interference of reflection from said reflecting surfaces, the optical system comprising the prism and lens system being so arranged and constructed that images formed by light corresponding to different lines of the spectrum of said source of light are relatively displaced, a shield provided with a slit located approximately in the plane of one of said images with its long dimension generally transverse to the direction of relative displacement of said images, a photosensitive strip adapted to be exposed to a portion of one of said images through said slit, and means for continuously moving said photosensitive strip across said slit.

2. Apparatus in accordance with claim 1, which also includes means adapted to superimpose transient changes in illumination upon said interference pattern at predetermined intervals.

3. Apparatus in accordance with claim 1, including means for adjustably rotating the constant deviation prism about an axis so chosen that the image produced by rays of a wave length for which said prism exhibits constant deviation properties in said optical system is subjected to practically no axial or transverse displacement upon rotation of said prism and consequent variation of wave length over a substantial operating range.

4. Apparatus for interferometric measurement including a source of light having a bright-line spectral emission characteristic including a plurality of bright lines, a constant deviation prism so positioned with respect to said source of light as to deflect light from one only of said bright lines through an angle onto a plurality of reflecting surfaces held in a manner adapted for interferometric measurement of changes in the distance between them, means including said constant deviation prism for deflecting the light reflected from said reflecting surfaces through an angle and projecting an image of the interference pattern set up by the interference of reflection from said reflecting surfaces, said image being projected upon an optical element adapted to be utilized in recording changes of said interference pattern upon changes in distance between said reflecting surfaces, said constant deviation prism being mounted for rotation about an axis such that rotation of said prism will cause light from another only of said bright lines to be reflected upon said reflecting surfaces and back upon said optical utilization element, said angles of deflection not being appreciably changed by said rotation.

5. The combination of claim 4, in which the reflecting surfaces are mounted in a furnace for changing the distance between said surfaces by temperature change, means for rotating said furnace about a vertical axis passing approximately through the center of said reflecting surfaces, means for tilting said furnace about a horizontal axis passing closely adjacent to said reflecting surfaces.

6. The combination of claim 4, in which the optical utilization element includes a screen having a slit therein and in which there is also provided a diagonal reflecting surface having a slit therein, said diagonal reflecting surface being positioned adjacent said screen and between said screen and said constant deviation prism, a light sensitive strip mounted adjacent said screen and on the side most remote from said constant deviation prism, the slit in said diagonal reflecting surface being in substantial registry with the slit in said screen, means to allow observation of the image reflected by said diagonal mirror, and means for closing said observation means when said observation means is not in use.

JAMES B. SAUNDERS.

REFERENCES CITED

The following references are of record in the file of this patent:

UNITED STATES PATENTS

| Number | Name | Date |
|---|---|---|
| 2,401,530 | Vought | June 4, 1946 |
| 2,320,350 | Del Riccio | June 1, 1943 |
| 1,625,625 | Ricker | April 19, 1927 |
| 1,709,809 | Rashevsky | April 16, 1929 |
| 1,573,401 | Heine | Feb. 16, 1926 |

FOREIGN PATENTS

| Number | Country | Date |
|---|---|---|
| 367,859 | Great Britain | Feb. 26, 1932 |
| 550,424 | France | Dec. 12, 1922 |
| 604,860 | France | Feb. 6, 1926 |

OTHER REFERENCES

"An Interferential Dilatometer Employing Automatic Photography," an article by R. H. Sinden in Journal of the Optical Society of America, volume 15, Number 3, pages 171 to 177. (Copy in Division 7, U. S. Patent Office.)

"Photographic Recording of Thermal Expansion of Metals at High Temperatures," an article in British Journal of Photography for September 15, 1930; p. 582. (Copy in Scientific Library, U. S. Patent Office.)